(12) United States Patent
Kaplan

(10) Patent No.: US 9,617,017 B1
(45) Date of Patent: Apr. 11, 2017

(54) APPARATUS AND METHODS FOR ORBITAL DEBRIS REMOVAL

(71) Applicant: Marshall H. Kaplan, Bethesda, MD (US)

(72) Inventor: Marshall H. Kaplan, Bethesda, MD (US)

( * ) Notice: Subject to any disclaimer, the term of this patent is extended or adjusted under 35 U.S.C. 154(b) by 0 days.

(21) Appl. No.: 15/352,185

(22) Filed: Nov. 15, 2016

Related U.S. Application Data

(63) Continuation of application No. 15/333,268, filed on Oct. 25, 2016, now abandoned.

(51) Int. Cl.
*B64G 1/40* (2006.01)
*B64G 1/64* (2006.01)
*B64G 1/10* (2006.01)

(52) U.S. Cl.
CPC ............ *B64G 1/646* (2013.01); *B64G 1/10* (2013.01); *B64G 1/402* (2013.01)

(58) Field of Classification Search
None
See application file for complete search history.

(56) References Cited

U.S. PATENT DOCUMENTS

| | | | | |
|---|---|---|---|---|
| 3,004,735 A | * | 10/1961 | Kinard | B64G 1/52 102/340 |
| 3,277,724 A | * | 10/1966 | Lundeberg | B64G 1/52 244/1 R |
| 3,381,420 A | * | 5/1968 | Brink | B32B 27/00 244/158.3 |
| 4,306,692 A | * | 12/1981 | Kaplan | B64G 1/285 244/165 |
| 4,381,092 A | * | 4/1983 | Barker | B64G 1/646 114/250 |
| 4,991,799 A | * | 2/1991 | Petro | B64G 1/10 244/14 |
| 5,299,764 A | * | 4/1994 | Scott | B64G 1/1078 244/172.5 |
| 5,511,748 A | * | 4/1996 | Scott | B64G 1/1078 244/172.5 |
| 6,439,508 B1 | * | 8/2002 | Taylor | B64G 1/12 244/158.3 |
| 6,655,637 B1 | * | 12/2003 | Robinson | B64G 1/007 244/172.4 |
| 6,962,310 B1 | * | 11/2005 | Bigelow | B64G 1/10 244/158.1 |

(Continued)

OTHER PUBLICATIONS

Phipps, C., "Catchers Mitt" as an Alternative to laser Space Debris Mitigation, AIP Conference Proceedings, Oct. 2010.

(Continued)

*Primary Examiner* — Medhat Badawi
(74) *Attorney, Agent, or Firm* — Wiley Rein LLP

(57) ABSTRACT

An orbital debris interception vehicle includes a satellite bus and a debris interception module releasably coupled to the satellite bus. The debris interception module includes a debris impact pad, such as a pancake-shaped Whipple shield. A plurality of such vehicles can be deployed into an equatorial orbit and maneuvered to intercept orbital debris as it passes through the equatorial plane. In particular, the satellite bus can release the debris interception module before an intercept and reconnect to it after the intercept.

10 Claims, 6 Drawing Sheets

(56) References Cited

U.S. PATENT DOCUMENTS

| | | | | |
|---|---|---|---|---|
| 7,575,200 B2* | 8/2009 | Behrens | B64G 1/1078 | 244/172.3 |
| 7,905,453 B2* | 3/2011 | Benedict | B64G 1/641 | 244/172.4 |
| 2004/0245407 A1* | 12/2004 | D'Ausilio | B64G 1/007 | 244/158.5 |
| 2005/0151022 A1* | 7/2005 | D'Ausilio | B64G 1/007 | 244/171.1 |
| 2005/0258311 A1* | 11/2005 | Scott | B64G 1/007 | 244/172.4 |
| 2006/0038085 A1* | 2/2006 | Duden | B64G 1/002 | 244/173.3 |
| 2006/0090636 A1* | 5/2006 | Yang | B64G 1/56 | 89/36.11 |
| 2008/0149776 A1* | 6/2008 | Benedict | B64G 1/641 | 244/158.1 |
| 2008/0296436 A1* | 12/2008 | D'Ausilio | B64G 1/007 | 244/171.1 |
| 2011/0121139 A1* | 5/2011 | Poulos | B64G 1/646 | 244/169 |
| 2011/0198446 A1* | 8/2011 | Knirsch | B64G 1/1078 | 244/171.7 |
| 2012/0068018 A1* | 3/2012 | Wright | B64G 1/66 | 244/171.7 |
| 2012/0175467 A1* | 7/2012 | Dye | F16L 59/065 | 244/171.7 |
| 2012/0286097 A1* | 11/2012 | Hanada | B64G 1/1078 | 244/158.1 |
| 2013/0062472 A1* | 3/2013 | Stokes | B64G 1/1078 | 244/171.7 |
| 2013/0175401 A1* | 7/2013 | Starke | B64G 1/1078 | 244/171.1 |
| 2015/0259081 A1* | 9/2015 | Albert | B64G 1/56 | 244/171.7 |
| 2016/0023783 A1* | 1/2016 | Griffith, Sr. | G05D 1/00 | 244/2 |
| 2016/0130020 A1* | 5/2016 | Chambert | B64G 1/1078 | 244/172.4 |
| 2016/0244190 A1* | 8/2016 | Okada | B64G 1/66 | |

OTHER PUBLICATIONS

Woignier, T. et al., Aerogels Materials as Space Debris Collectors, Hindawi Publishing Corporation, 2013.

* cited by examiner

APPARATUS AND METHODS FOR ORBITAL DEBRIS REMOVAL

CROSS-REFERENCE TO RELATED APPLICATIONS

This application is a continuation of U.S. application Ser. No. 15/333,268, filed 25 Oct. 2016, now pending. The forgoing application is hereby incorporated by reference in its entirety as though fully set forth herein.

BACKGROUND

The instant disclosure relates generally to the removal and control of orbital debris. In particular, the instant disclosure relates to apparatus and methods for removing orbital debris from low Earth orbits ("LEOs").

Objects that are in orbit around Earth as the result of space initiatives that no longer serve any function are called "orbital debris" (the term "debris" is used herein as a shorthand to refer to orbital debris). Examples of orbital debris include expired spacecraft, upper stages of launch vehicles, debris released during spacecraft separation from its launch vehicle or during mission operations, debris created as a result of spacecraft or upper stage explosions or collisions, solid rocket motor effluents, paint flecks, and thermal blankets.

Most orbital debris is concentrated in what is considered low Earth orbit ("LEO"). Indeed, orbital debris has been accumulating in LEOs between 600 km and 1200 km altitude for the past 59 years. The United States Space Surveillance Network, operated by the United States Air Force, estimates that there are more than 500,000 pieces of debris larger than 1 cm orbiting Earth today, including over 22,000 pieces larger than 10 cm that are actively tracked. This ignores millions of smaller, untrackable pieces of orbital debris. Thus, the debris density in these LEOs has reached a level of serious concern to active satellite operators.

In LEOs, the average closing speed at which collisions with orbital debris takes place is about 10 km/sec. Even though debris represents a growing international crisis, space agencies have taken almost no action to remove debris and have only limited debris sensing and tracking capabilities for objects larger than 10 cm.

Trajectory projections, based on collected data, are supplied to satellite owners and operators. Those few operators that have maneuverable satellites may try to carry out collision-avoidance maneuvers based on projections derived from debris tracking data. Such maneuvers are rarely tried, however, because the reaction times are short and the accuracy of collision predictions is often insufficient to warrant an expensive and complicated change in a satellite's orbit. Since no debris-removal flight programs have been funded, satellite operators with assets in high-density debris zones have no assurance of safety from collisions.

Although collisions can be difficult to detect, over the past several years there have been numerous reports of small debris encounters and one reported collision between an operational satellite and an expired satellite (i.e., the 2009 Iridium-Kosmos incident). Nevertheless, the frequency of collisions is trending upward, especially in the 600 km to 1200 km altitude region of near-Earth space. In addition to the already several hundred active satellites, several thousand more are planned for launch into this zone in the next few years.

While the addition of debris shielding on operating satellites may be partially effective, the collision frequency and level of damage will become progressively less tolerable over time. The prevention of future debris creation has been suggested, but the debris density has already passed the point where its increase due to ongoing collisions is unstable. Some amount of ongoing debris removal is necessary in order to maintain at least a minimum acceptable level of safety in orbit. A solution to this growing threat of catastrophic destruction of all satellite assets in the high-density debris zone has become an international mandate.

U.S. Pat. No. 4,991,799 describes an orbital debris sweeper for removing particles from orbit. This apparatus includes a central sweeper core which carries a debris monitoring unit and a plurality of large area impact panels that rotate about a central sweeper axis. In response to information from the debris monitoring unit, a computer determines whether individual monitored particles have impacted one of the rotating panels.

U.S. Pat. No. 3,277,724 is directed to a device for measuring the mass and velocity of meteoroid particles which collide therewith. The device consists of two inflatable spherical structures, one of which is concentrically mounted within the other. The collision of particles with the device results in a short circuit between adjacent metallic layers, which in turn provides an indication of the mass of the debris particle which impacted the device.

U.S. Pat. No. 3,004,735 discloses an inflatable panel adapted to be towed behind a launch vehicle to determine the debris particle environment in the vicinity of the vehicle. The energy content and frequency of particles colliding with the panel can be measured.

While the above patents recognize the significant adverse effects of debris colliding with active spacecraft, they do not teach an effective solution for reducing the population of threatening debris objects. Furthermore, these devices require complex maneuvering and excessive use of propellant for their maneuvering thrusters.

U.S. Pat. App. Pub. No. 2016/0023783 describes a spacecraft control unit configured to guide and navigate an apparatus to a target. The apparatus includes a dynamic object characterization unit configured to characterize movement, and a capture feature, of the target. The apparatus further includes a capture and release unit configured to capture a target and deorbit or release the target. A collection of these apparatuses is employed as multiple, independent and individually operated vehicles launched from a single launch vehicle for the purpose of disposing of multiple debris objects. This patent application employs a very expensive set of spacecraft that must maneuver to the targets. Excessive propellant and maneuvering time are required for each target before capture.

U.S. Pat. App. Pub. No. 2012/0068018 describes fiber-based debris interceptors that are used to intercept and/or contain space debris. The debris interceptors may be made up of fibers that are formed in space from a material supply on a space vehicle. These interceptors may be separated from the space vehicle and used to passively drift in order to remove debris from an orbit or to otherwise prevent debris from entering an orbit to avoid damaging a satellite or other spacecraft traveling in that orbit. The debris interceptors are not retrieved, but may be deployed prior to later launches of valuable spacecraft in order to "cleanse" the intended orbits of debris. Debris objects may pass through the debris interceptor, but in so doing may lose energy so as to de-orbit. This patent application describes a device that is used to protect one satellite at a time.

In "Catchers' Mitt as an Alternative to Laser Space Debris Mitigation," Phipps describes the placement of a single block of low density material in an elliptical, near-equatorial orbit that would sweep out debris in near-Earth space between about 400 km and about 1100 km altitude. Phipps does not, however, address the control of this block or the challenge of avoiding active satellites. Nor does Phipps provide servicing or operating details for the block.

In "Aerogels Materials as Space Debris Collectors," Woignier discusses the use of very light weight materials for use in space debris impact pads. Woignier does not, however, discuss the vehicles on which such materials would be used.

Thus, previously proposed orbital debris removal approaches require the use of extremely expensive and complex space systems in order to accomplish the removal of single debris objects. The implied complexity and expense of such approaches have prohibited any actual debris removal missions.

BRIEF SUMMARY

Disclosed herein is an orbital debris interception vehicle, including: a satellite bus; and a debris interception module releasably coupled to the satellite bus, wherein the debris interception module includes a debris impact pad. The debris impact pad can include a Whipple shield, such as a pancake-shaped Whipple shield.

According to aspects of the disclosure, the debris interception module further includes a propulsion system and a control unit configured to activate the propulsion system to maneuver the debris interception module into an orbital pathway of a debris object. Similarly, the control unit can be further configured to activate the propulsion system to maneuver the debris interception module out of an orbital pathway of an active satellite, such as by reorienting the debris interception module to present a minimum cross-section along a direction of the orbital pathway of the active satellite.

To releasably secure the debris interception module to the satellite bus, the satellite bus can include a docking probe, and the debris interception module can include a receiver for the docking probe.

Also disclosed herein is a method of intercepting orbital debris, including the steps of: deploying at least one orbital debris interception vehicle into an equatorial orbit, the at least one orbital debris interception vehicle including: a satellite bus; and a debris interception module releasably coupled to the satellite bus, wherein the debris interception module includes a debris impact pad; maneuvering the debris interception module such that the debris impact pad of the debris interception module is in an orbital pathway of a debris object; allowing the debris object to impact the debris impact pad of the debris interception module.

The method can also include releasing the debris interception module from the satellite bus before the debris object impacts the debris impact pad of the debris interception module; and reconnecting the debris interception module to the satellite bus after the debris object impacts the debris impact pad of the debris interception module.

It is contemplated that the step of maneuvering the debris interception module such that the debris impact pad of the debris interception module is in an orbital pathway of a debris object can include maneuvering the debris interception module into the orbital pathway of the debris object after the debris interception module is released from the satellite bus and before the debris object impacts the debris impact pad of the debris interception module.

Similarly, the method can include maneuvering the at least one orbital debris interception vehicle such that it is out of an orbital pathway of an active satellite, such as by reorienting the at least one orbital debris interception vehicle to present a minimum cross-section along a direction of the orbital pathway of the active satellite. In aspects of the disclosure, this also includes receiving tracking data for the orbital pathway of the active satellite.

According to aspects of the disclosure, the step of deploying at least one orbital debris interception vehicle into an equatorial orbit includes deploying a plurality of orbital debris interception vehicles into the equatorial orbit.

The step of maneuvering the at least one orbital debris interception vehicle such that the debris impact pad of the debris interception module is in an orbital pathway of a debris object can include receiving tracking data for the orbital pathway of the debris object.

The debris impact pad of the debris interception module can include a Whipple shield.

The step of maneuvering the debris interception module such that the debris impact pad of the debris interception module is in an orbital pathway of a debris object can include maneuvering the satellite bus with the debris interception module releasably connected thereto.

The foregoing and other aspects, features, details, utilities, and advantages of the present invention will be apparent from reading the following description and claims, and from reviewing the accompanying drawings.

DETAILED DESCRIPTION

The instant disclosure provides apparatus and methods for the systematic and sustained removal of orbital debris. The instant disclosure also provides new orbital maneuvering techniques in furtherance of the international mandate for space debris removal and control.

In particular, described herein is an orbital debris interception vehicle, including a satellite bus and a detachable debris interception module ("DIM"). According to aspects of the instant disclosure, the DIM can be placed in the direct path of a debris object at the equatorial position and time of the debris object's crossing.

The inventor estimates that the apparatus and methods described herein will cost no more than about 1% of other possible options for the cleanup and maintenance of the near-Earth high-density debris field.

The following concepts provide relevant background to the teachings herein:

Every piece of orbital debris travels on a unique and separate orbital path. Therefore, no two objects in orbit have any interaction, except in those cases where a collision takes place.

Most debris objects are moving in circular or near-circular orbits at speeds in excess of 7.25 km/s.

All Earth orbits are planar (i.e., in planes that contain the center of the Earth). Thus, all objects that travel in highly inclined orbits tend to intensify the density of objects as they fly over the polar regions of the Earth. For this reason, it is theorized that a higher frequency of collisions between debris and spacecraft, and among debris objects themselves, occurs near the north- and south-polar regions. A corollary is that the region of least debris object density is the equatorial zone.

LEO debris of most concern to satellite operators resides in the altitude range of about 600 km to about 1200 km and in orbits that are inclined at least about 35 degrees to the equator.

Every orbiting object will cross the equator twice per circuit around the Earth, once from north-to-south and once from south-to-north.

Figure 1:
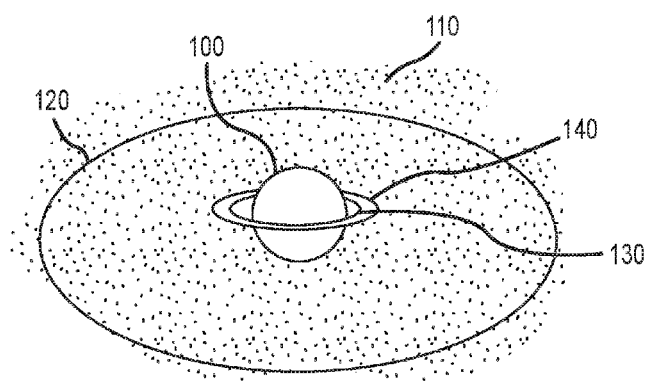
FIG. 1 is an illustration of the distribution of orbital debris around the Earth.

FIG. 1 is a depiction of the Earth 100 with the instantaneous positioning of debris objects 110 from near-Earth to beyond the geostationary Earth orbit ("GEO") 120 located at approximately 35,800 km above the Earth and in the equatorial plane.

FIG. 1 also depicts the two altitude limits of the most dangerous LEO debris: the lower limit 130 at about 600 km altitude and the upper limit 140 at about 1200 km altitude. Many pieces of debris that threaten the safety of active scientific, commercial, and military satellites in LEO are resident between these two altitudes and must therefore pass between the depicted equatorial circles 130, 140 twice each circuit around the Earth 100.

Thus, although FIG. 1 illustrates a much larger field of orbital debris 110 about the Earth 100, the teachings herein will be explained with reference to debris in LEOs between about 600 km and 1200 km altitude (e.g., between limits 130 and 140). It should be understood, however, that the instant disclosure can be extended to the removal of orbital debris 110 at higher and/or lower altitudes.

Figure 2:
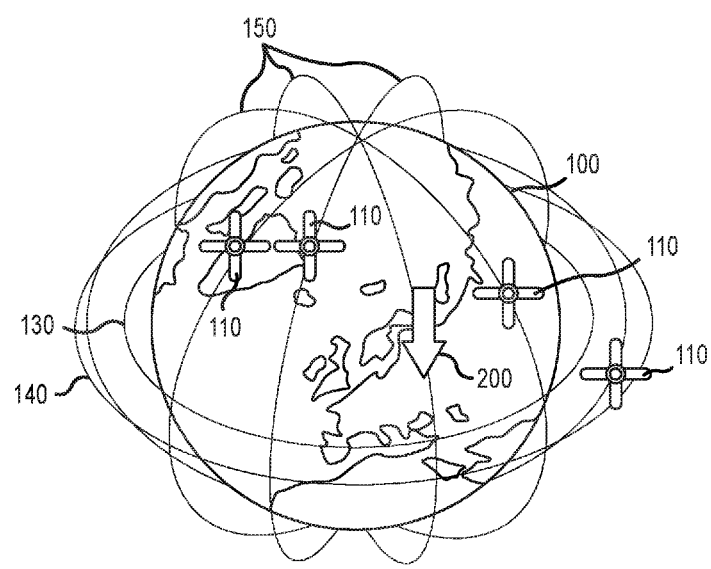
FIG. 2 illustrates an exemplary debris field in which all debris objects and active spacecraft are in polar orbits.

FIG. 2 illustrates several debris objects 110 and an operating satellite 200 in high inclination orbits. As shown in FIG. 2, debris objects 110 and satellite 200 are orbiting Earth 100 in polar orbits 150 having inclinations of about 90 degrees (as those of ordinary skill in the art will appreciate, the "inclination" of an orbit is the angle of the orbital plane as measured from the equatorial plane). Although all orbits 150 depicted in FIG. 2 have the same inclination, no two orbits 150 are in the same plane; that is, every orbit 150 crosses the equatorial plane at different points.

Those of ordinary skill in the art will recognize that most debris objects 110 are not in exact polar orbits 150, but are in orbits 150 having inclinations greater than about 35 degrees. Thus, the orbits 150 shown in FIG. 2 should be regarded as merely illustrative for purposes of explaining an embodiment of the present teachings, and in particular illustrative of the fact that every debris object 110 and active satellite 200 travels in its own orbit 150 and crosses the equatorial plane twice per circuit.

Figure 3:
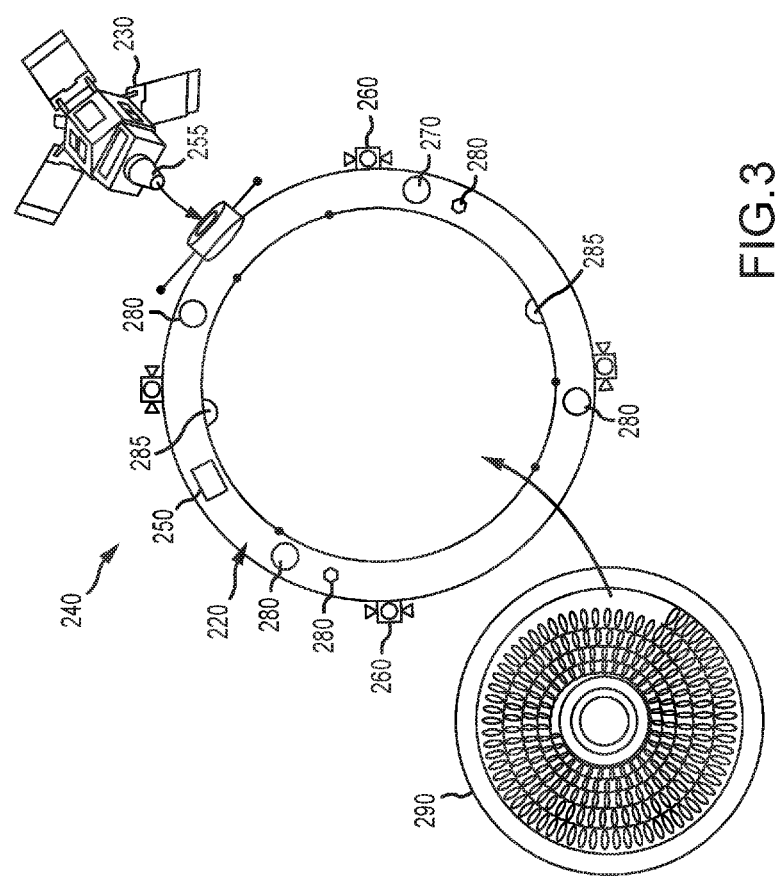
FIG. 3 depicts a debris interception vehicle according to aspects of the instant disclosure.

FIG. 3 depicts an orbital debris interception vehicle 240. Orbital debris interception vehicle 240 includes a satellite bus 230 and a DIM 220.

Satellite bus 230 is similar to traditional satellite and/or spacecraft buses in that it contains subsystems such as structure, power, propulsion, telemetry, command, attitude determination and control, and avionics. Satellite bus 230, which is not expendable, provides support functions related to the control and operation of orbital debris interception vehicle 240 for debris removal as described herein. Those of ordinary skill in the art will be familiar with satellite and/or spacecraft buses, such that a detailed description of satellite bus 230 is not necessary herein.

DIM 220, which is deployed and retrieved multiple times by satellite bus 230, represents the working payload for orbital debris interception vehicle 240. The function of DIM 220 is to absorb debris object impacts, leaving the debris object with some reduced level of orbital energy and/or altering the debris object's orbital path in a manner that shortens the orbital life of the debris object.

To the foregoing end, DIM 220 includes a debris impact pad 290. In general, debris impact pad 290 is constructed to deal with debris objects of a particular size or size range. Moreover, DIM 220 is intended to withstand multiple debris encounters before it requires replacement.

Therefore, it is contemplated that DIM 220, and more particularly debris impact pad 290 thereof, can vary in size, mass, and/or construction according to the type of debris object that DIM 220 is intended to encounter and/or the number of encounters it is intended to absorb before replacement becomes necessary.

Figure 4:
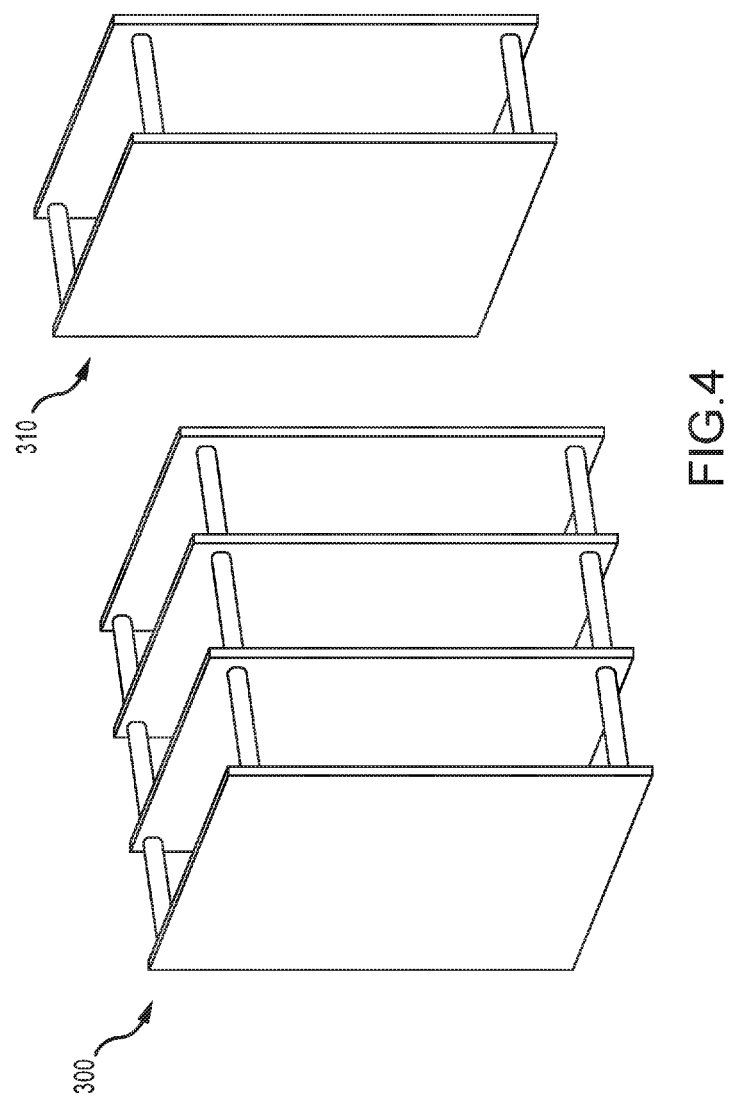
FIG. 4 illustrates both a multi-layer Whipple shield and two-layer debris shield.

For example, according to aspects of the disclosure, debris impact pad 290 can include a plurality of spaced layers of various rigid and non-rigid materials, such as ceramic cloth, Kevlar fabric, and aerogel, in configurations known as Whipple shields, generally formed into pancake-like shapes. FIG. 4 depicts a twin-layer Whipple shield 310, which can be used to intercept small debris objects (e.g., debris objects of up to a few centimeters), and a multi-layer Whipple shield 300, which can be used to intercept larger debris objects. Those of ordinary skill in the art will be familiar with the construction of Whipple shields, including stuffed Whipple shields (e.g., Whipple shields that include a filling, such as of ceramic cloth and Kevlar fabric, between the bumpers), and thus will appreciate how to extend the teachings herein to create Whipple shield impact pads 290 suitable for even larger debris objects.

Of course, it is also contemplated that impact pad 290 can take a form other than a Whipple shield without departing from the scope of the instant disclosure. It is desirable, however, for impact pad 290 to be generally pancake-shaped (that is, presenting a large cross section in a first plane and a much smaller cross-section in a second plane perpendicular to the first plane). This allows impact pad 290 to be reoriented such that it presents its maximum cross-section in the equatorial plane for a debris encounter and its minimum cross-section in the equatorial plane to avoid active satellites 200.

In embodiments, DIM 220 can also include an on-board attitude determination and control system 250. System 250 can utilize inputs from one or more sensors 280 and an onboard propulsion system that includes thrusters 260 and propellant tanks 270 to maneuver DIM 220. For example, system 250 can be operable to make corrections in position and/or speed of DIM 220, to maneuver DIM 220 in order to make a timely crossing of orbit 150 of a debris object 110, to damp any motion of DIM 220 after a debris encounter, to maneuver DIM 220 out of the orbit 150 of an active satellite 200, to reorient DIM 220 such that it presents its minimum cross-section along the direction of the orbit 150 of an active satellite 200, to deorbit DIM 220 once expended, and the like.

DIM 220 can also include one or more cameras 285, which can be utilized, for example, to assess the condition of DIM 220 following a debris encounter.

Satellite bus 230 and DIM 220 are releasably coupled to one another. In embodiments of the disclosure, satellite bus 230 includes a docking probe 255, and DIM 220 includes a corresponding receiver. This allows DIM 220 to separate from satellite bus 230 prior to a debris encounter, such that only DIM 220 intercepts the debris object, keeping the non-expendable satellite bus 230 clear of the debris. DIM 220 can then be reattached to satellite bus 230 after the debris encounter, such that satellite bus 230 can maneuver DIM 220 to the projected location of a subsequent debris encounter.

Figure 5:
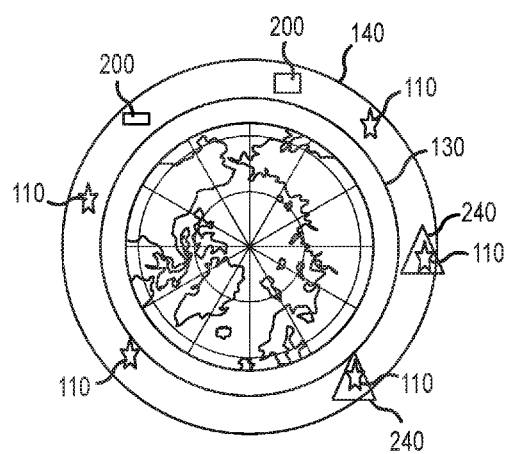
FIG. 5 depicts the equatorial debris crossing band in which debris interception vehicles can operate according to aspects disclosed herein.

In use, at least one orbital debris interception vehicle 240 can be deployed into an equatorial orbit. For example, FIG. 5 shows a plan view of the equatorial plane including debris objects 110, active satellites 200, and a plurality of orbital debris interception vehicles 240.

Figure 6:
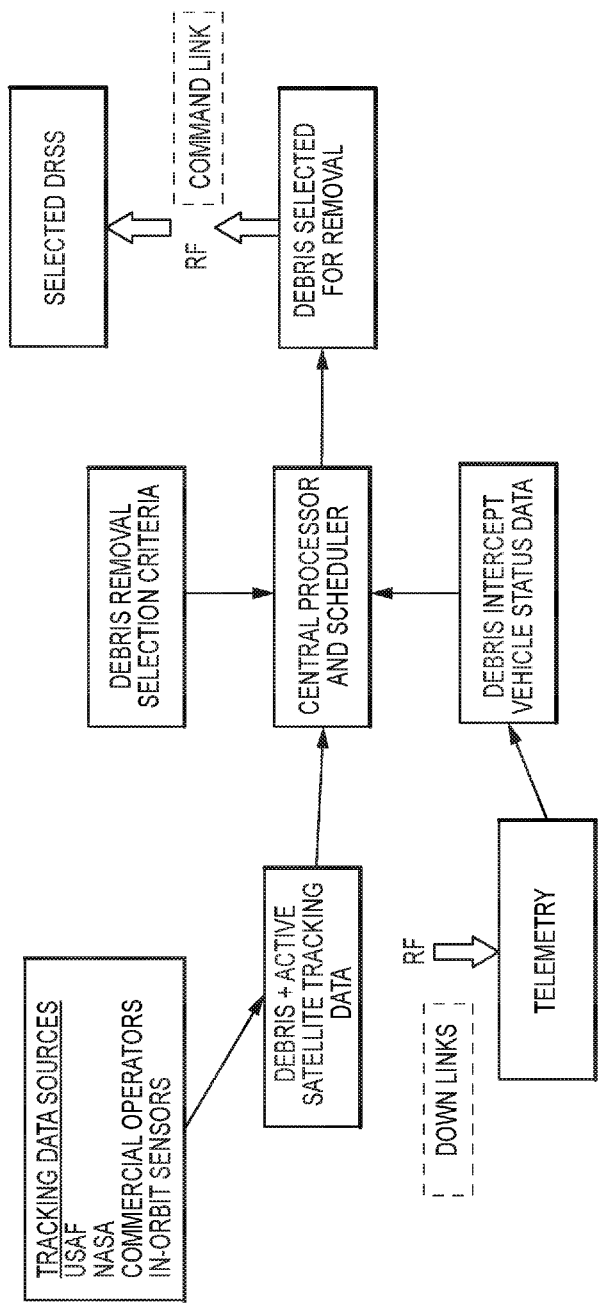
FIG. 6 is a representative operational flowchart according to the teachings herein.

A DIM 220 can then be maneuvered such that its debris impact pad 290 is in the orbit 150 of a debris object 110. For example, as shown in the representative operational flow diagram of FIG. 6, tracking data for debris objects 110 and active satellites 200 can be provided by the United States Air Force, NASA, commercial operators, and in-orbit sensors and input to a central processing and scheduling unit, which can use the tracking data to predict the times and locations at which debris objects 110 within the 600 km to 1200 km altitude zone will cross the equatorial plane. Debris interception vehicles 240 can also transmit telemetry on their status and position to the central processing and scheduling unit.

The central processing and scheduling unit can use the received data (e.g., tracking data and debris interception vehicle telemetry) to select debris objects 110 for intercept, to identify the most suitable debris interception vehicle(s) 240 to make the intercept (e.g., by identifying the most convenient, in terms of minimum propellant expenditure, debris interception vehicle 240 to the equatorial crossing point of the debris object 110 to be intercepted), and to command the respective debris interception vehicle 240 to move its associated DIM 220 into position (e.g., with its associated debris impact pad 290 making a timely crossing of orbit 150 of the debris object 110 to be intercepted) and then to release DIM 220 from satellite bus 230. Of course, system 250 of DIM 220 can also be used to "fine tune" the position of DIM 220/debris impact pad 290 after release from satellite bus 230 pre-encounter.

Once positioned, debris object 110 can be allowed to strike debris impact pad 290. Debris objects 110 can range in size from a few millimeters to a few meters. Multiple small debris objects 110 can be removed in a single encounter with DIM 220. Larger debris items 110 can break up as they pass through debris impact pad 290. Generally, however, the encounter between debris object(s) 110 and debris impact pad 290 will result in a loss of orbital energy for debris object(s) 110, ultimately leading to atmospheric entry and burn up. More particularly, depending on the amount of orbital energy lost upon collision with debris impact pad 290, the debris object 110 may: (1) enter a new orbit that will expose the debris object 110 to increased atmospheric drag and an ultimate reentry; (2) leave orbit immediately and reenter the Earth's atmosphere; or (3) be absorbed by debris impact pad 290.

Those of ordinary skill in the art will appreciate that untracked debris objects 110 can also be intercepted, though such intercepts will rely more on chance encounters than do intercepts of tracked debris objects 110, which can be more readily predicted from available tracking data.

Similarly, the central processing and scheduling unit can command debris interception vehicles 240 to maneuver out of the orbit 150 of an active satellite 200 as it crosses the equatorial plane. For example, as discussed above, the central processing and scheduling unit can reorient DIMs 220 to present a minimum cross-section along the direction of the orbit 150 of an active satellite 200.

Following the debris encounter, system 250 can be used to damp any residual motion of DIM 220 and/or the condition of DIM 220 can be assessed (e.g., using camera(s) 285). Assuming that DIM 220 is not expended, it can be reconnected to its associate satellite bus 230 and readied for its next debris encounter.

An additional result of a debris encounter may be a slight orbit change for DIM 220. It is contemplated that these slight orbit changes can be balanced over time, such as by alternating or otherwise varying the direction of the debris encounter (e.g., balancing north-to-south intercepts with south-to-north intercepts). If desired or required, additional corrections can be made by system 250 on board DIM 220 and/or by satellite bus 230 when coupled to DIM 220.

According to aspects of the disclosure, debris interception vehicle 240 is designed to be serviced by an On-Orbit Servicing Unit ("OOSU"). For example, an OOSU can service and/or refuel the propellant tanks on satellite bus 230 and/or DIM 220, and can also deliver replacements for expended DIMs 220.

Although several embodiments of this invention have been described above with a certain degree of particularity, those skilled in the art could make numerous alterations to the disclosed embodiments without departing from the spirit or scope of this invention.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of intercepting orbital debris, comprising:
communicating with a satellite constellation including a plurality of orbital debris interception vehicles in an equatorial orbit, each orbital debris interception vehicle comprising:
a satellite bus; and
a debris interception module releasably coupled to the satellite bus, wherein the debris interception module comprises a debris impact pad;
wherein communicating with the satellite constellation further comprises:
receiving equatorial crossing data for a debris object and an active spacecraft;
identifying a closest orbital debris interception vehicle to an equatorial crossing point of the debris object;
commanding at least one of the satellite bus and the debris interception module of the closest orbital debris interception vehicle to the equatorial crossing point of the debris object to maneuver such that the debris impact pad of the debris interception module of the closest debris interception vehicle to the equatorial crossing point of the debris object is at the equatorial crossing point of the debris object;

commanding the closest orbital debris interception vehicle to the equatorial crossing point of the debris object to release the debris interception module;

after the debris object has collided with the debris interception module, commanding the closest orbital debris interception vehicle to the equatorial crossing point of the debris object to reattach to the debris interception module;

identifying a closest orbital debris interception vehicle to an equatorial crossing point of the active spacecraft; and commanding at least one of the satellite bus and the debris interception module of the closest orbital debris interception vehicle to the equatorial crossing point of the active spacecraft to maneuver such that the active spacecraft will not collide therewith.

2. The method according to claim 1, wherein:

the step of commanding at least one of the satellite bus and the debris interception module of the closest orbital debris interception vehicle to the equatorial crossing point of the debris object to maneuver such that the debris impact pad of the debris interception module of the closest debris interception vehicle to the equatorial crossing point of the debris object is at the equatorial crossing point of the debris object occurs prior to the step of commanding the closest orbital debris interception vehicle to the equatorial crossing point of the debris object to release the debris interception module.

3. The method according to claim 1, wherein:

the step of commanding at least one of the satellite bus and the debris interception module of the closest orbital debris interception vehicle to the equatorial crossing point of the debris object to maneuver such that the debris impact pad of the debris interception module of the closest debris interception vehicle to the equatorial crossing point of the debris object is at the equatorial crossing point of the debris object occurs subsequent to the step of commanding the closest orbital debris interception vehicle to the equatorial crossing point of the debris object to release the debris interception module and comprises commanding the debris interception module of the closest orbital debris interception vehicle to the equatorial crossing point of the debris object to maneuver such that the debris impact pad of the debris interception module of the closest debris interception vehicle to the equatorial crossing point of the debris object is at the equatorial crossing point of the debris object.

4. The method according to claim 1, wherein the debris impact pad comprises a Whipple shield.

5. The method according to claim 1, wherein the debris impact pad comprises an aerogel material.

6. The method according to claim 1, wherein the debris impact pad comprises a ceramic cloth.

7. The method according to claim 1, wherein the debris impact pad comprises a Kevlar fabric.

8. The method according to claim 1, wherein communicating with the satellite constellation further comprises receiving telemetry from the satellite constellation.

9. The method according to claim 8, wherein the telemetry received from the satellite constellation comprises information regarding a condition of the debris interception module of the closest orbital debris interception vehicle to the equatorial crossing point of the debris object after the debris object has collided with the debris interception module.

10. The method according to claim 1, wherein communicating with the satellite constellation further comprises commanding the satellite bus of the closest orbital debris interception vehicle to the equatorial crossing point of the debris object to maneuver clear of the equatorial crossing point of the debris object after commanding the closest orbital debris interception vehicle to the equatorial crossing point of the debris object to release the debris interception module.

* * * * *